July 14, 1942.　　　H. BARNETT　　　2,290,013
POSITIVE PILOT VALVE
Filed April 10, 1941
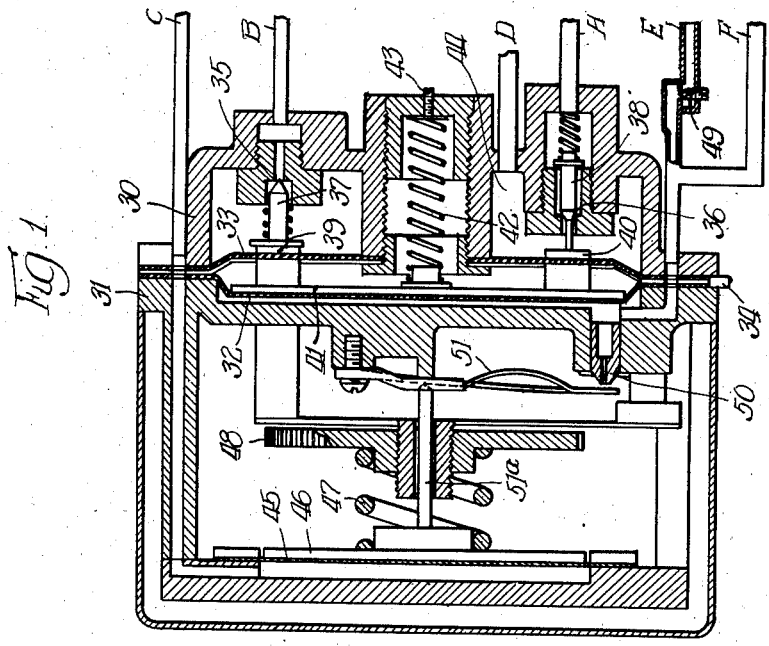
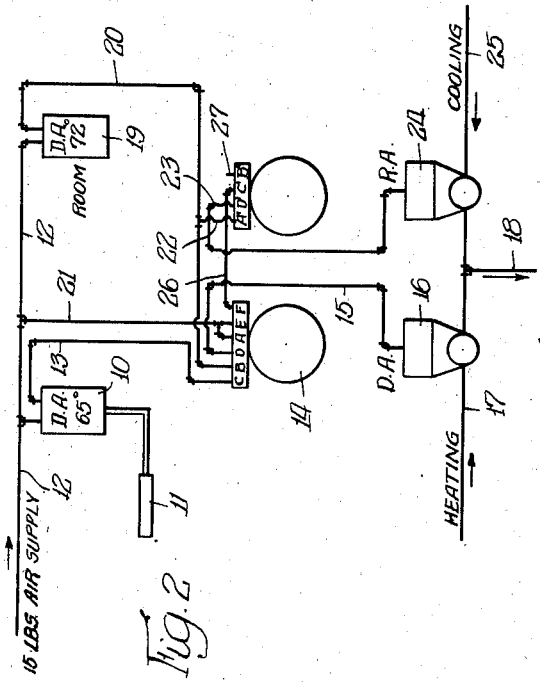
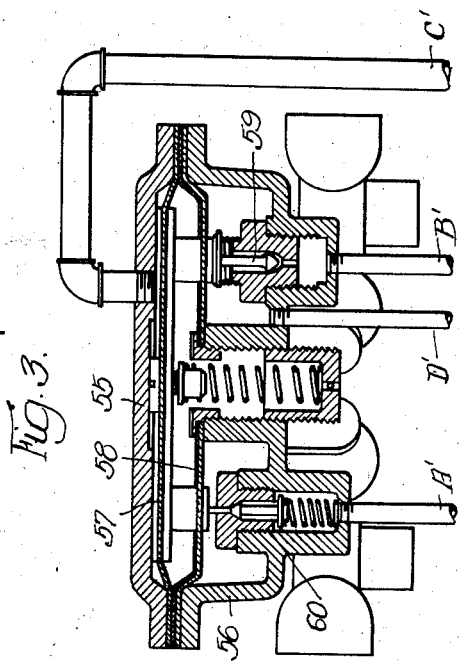
INVENTOR.
Harry Barnett,
BY
attý.

Patented July 14, 1942

2,290,013

UNITED STATES PATENT OFFICE 2,290,013

POSITIVE PILOT VALVE

Harry Barnett, Chicago, Ill., assignor to The Powers Regulator Company, Chicago, Ill., a corporation of Illinois Application April 10, 1941, Serial No. 387,797

5 Claims. (Cl. 236—1)

My invention relates to heat control mechanism and particularly to a positive action pilot or relay valve.

An object of my invention is to provide valve mechanism of the type described in which extremely accurate control may be assured. This is essential for many types of industrial processes and operations, particularly where a desired temperature is required throughout the year in locations where heating or cooling are required, due to outdoor temperatures. It is customary to provide pilot valves for the purpose of cutting in or out the heating or cooling mediums, but it has not been possible in apparatus heretofore known to maintain accurate control at the critical point where a change is required from heating to cooling and vice-versa. Due to lack of sensitivity of control, it has not been possible to control the action within approximately 2° and occasions arise where, due to such lack of sensitivity, both heating and cooling have been supplied simultaneously.

In the apparatus here disclosed I am able to positively shift from heating to cooling control on a variation of approximately $\frac{1}{10}$ of a degree Fahrenheit, there being no "drag" or overlapping of the two controls.

The invention will be more readily understood by reference to the accompanying drawing, in which, Fig. 1 is a sectional view through a positive pilot valve constructed in accordance with my invention, it being noted, however, that the connecting pipes for the various elements of a system are shown diagrammatically for ease in understanding the air circuits;

Fig. 2 is a diagrammatic lay-out of a typical installation, this installation involving the use of a second, more simple, pilot valve; and, Fig. 3 is a sectional view through the last named pilot valve.

As a means for facilitating the description of the valve which constitutes the subject matter of my invention, I have indicated diagrammatically in Fig. 2 a system involving its use, this system comprising a direct-acting thermostat 10 controlled by an outdoor bulb 11 and supplied with air under pressure through the pipe 12. The return line 13 from this thermostat communicates with the entrance port C of the instrument of my invention, indicated generally by the numeral 14. Through an outlet port D, and a pipe 15, the instrument is connected to a direct-acting, air-controlled valve 16 which governs a supply of a heating medium through a pipe 17. The pipe 18 from the valve 16 delivers the medium to a space, the temperature of which is to be controlled.

A thermostat 19 within the space to be controlled is provided with air from the pipe 12 and its return line 20 communicates with the port B in the instrument shown in Fig. 1. A secondary supply of air under pressure is supplied by a branch 21 from the pipe 12 and this pipe delivers air to the ports A and E of instrument of Fig. 1.

The return line 20 from the thermostat 19 also has a branch 22 communicating with the port A' of the secondary pilot valve shown in Fig. 3. A pipe 23 communicates with a port D' of said last-named valve and with a reverse acting air valve 24 controlling the delivery of a cooling medium from a pipe 25 to the pipe 18. The pipe 26 provides a connection between the port F of the instrument shown in Fig. 1 and the port C' of the instrument shown in Fig. 3. The port B' and the stub pipe 27 of instrument of the secondary pilot valve are open to the atmosphere.

The understanding as to the terms "direct-acting" and "reverse-acting" is as follows:

When thermostats, such as indicated at 10 and 19, are influenced by an increase of temperature, an increased pressure is built up in their return lines and when a valve, such as shown at 16 in Fig. 2, is subjected to an increase pressure, the valve is closed. These are called "direct-acting" instruments. When, however, the reverse is true as in the valve 24 shown in Fig. 2, the valve is opened by an increase in pressure and this is termed a reverse acting valve.

In the construction of Fig. 1 which, as before stated, is diagrammatical, so far as the pipe connections are concerned, I provide a casing consisting of two sections 30—31 joined by means of suitable flanges and serving to confine two diaphragms 32—33 which are spaced apart, and the space between which is open to the atmosphere as indicated at 34. The portion 30 of the casing provides two valve seats 35—36 controlled by valves 37—38. Springs are so placed as to tend to open the valve 37 and close the valve 38. These valves are both controlled by members 39—40 which project through the diaphragm 33 and abut a face plate 41 seated against the diaphragm 32. A spring 42 bears against the face plate 41 and tends to resist a motion that would operate the valves 37—38. An adjusting screw 43 provides for varying the compression of the spring.

The space 44 between the outside wall of the casing 30 and the diaphragm 33 is open to the outlet D which, as stated before, is in communication with the heat control valve 16.

The valve 37 controls the passage through the port B which is connected to the return pipe 20 of the room thermostat, while the valve 38 connects the port A and its connecting pipe 21 to a source of air under pressure.

In the portion 31 of the casing I provide a diaphragm 45, one side of which is open to air delivered through the pipe 13 and the passage C. A face plate 46 supports the diaphragm, the face plate being pressed by a coil spring 47, held by an adjusting nut 48, by means of which the action of the diaphragm 45 may be regulated.

Air under pressure is admitted through the pipe 21 to the port E, a restriction screw 49 being indicated in the passage. This pipe is open to the space behind the diaphragm 32 and in this space I provide a leak port 50, the outlet from which is controlled by a snap spring element 51, the details of the construction of which are not important, since no claim is made herein as to such details. Such snap springs are known as "Micro" springs and have the characteristics of a complete throw from one to another position by a movement of approximately .001 inch. This spring is contacted by a plunger 51a which engages the face plate 46. Thus upon the slightest movement of the diaphragm 46, the spring 51 is caused to close or open the leak port 50.

The operation of the valve thus far described is as follows:

Assuming the outdoor thermostat to be set at a temperature of 65°, at any temperature under 65° no substantial pressure is admitted from the line 12 and thus no pressure will be delivered by the pipe 13 to the port C. Thus the diaphragm 45 will remain in the position shown in the drawing, due to the action of the spring 47. In this position the snap spring will be away from the leak port 50 and any air entering through the port E will be wasted through the leak port, thus allowing the diaphragm 32 to remain in the position shown in the drawing. In that position the valve 38 will remain closed, due to the action of its spring, and the valve 37 will remain open, due to the action of its spring. Thus the port B will be open to the return line 20 from the room thermostat and through the port D and the pipe 15 to the heat control valve 16. Thus the room temperature will be controlled by the thermostat 19. Assuming, however, that the temperature rises to a point very slightly above the 65° setting of the thermostat 10, air under substantial pressure will be admitted to the pipe 13, the port C and the diaphragm 45. Following the slightest movement of said diaphragm, the snap spring 51 will be actuated to close the leak port 50 whereupon pressure admitted through the port E will build up behind the diaphragm 32, thus moving it inwardly and causing the unseating of the valve 38 and the seating of the valve 37. This serves to place in communication the port A and the port D, thus admitting air under pressure to the line 15 and positively closing the direct-acting heat-control valve 16.

A branch port F is open to the port E at a point past the restriction valve 49, and this port, through the pipe 26, communicates with the port C* of the instrument shown in Fig. 3. In the construction of Fig. 3 the instrument includes a two part casing 55—56 between which two diaphragms 57—58 are held. The portion 56 of the casing provides reversely positioned valves 59—60 adapted to be actuated by the diaphragm 57, the one being open as the other is closed. The valve 59 opens the port B' to the atmosphere while the valve 60 opens the port A' to the branch pipe 22 connected to the room thermostat.

Thus it will be seen that as pressure builds up behind the diaphragm 32 of the instrument of Fig. 1, it is likewise built up in the passage F, the pipe 26 and the passage C' in Fig. 3 behind the diaphragm 57. Movement of the said diaphragm will thus serve to close the valve 59, thus shutting off the escape of air to the atmosphere and opening the valve 60 which serves to place in communication the room thermostat with the port D' and the pipe 23 to the reverse-acting cooling valve 24. Thus the room thermostat will then be in control of the cooling supply and upon an increase in room temperature, pressure will be admitted to the cooling valve 24, thus causing it to open and to admit a cooling medium to the space which is to be controlled.

As the result of the described arrangement the shift from heating to cooling is positive and the actions cannot by any possibility overlap. Furthermore, such shift takes place following a very slight change of temperature, for example $\tfrac{1}{10}$ of a degree above or below the setting of the outdoor thermostat. In that connection it should be noted that neither the heating nor cooling valves can be open at the same time.

It will be noted also that by providing the outlet F in the pilot valve, one or more auxiliary control valves, one of which is shown in Fig. 3, may be operated with pressure means that are exact in character with the pressure effective on the pilot valve. This has been found to be an important consideration.

Only one of many adaptations of the pilot valve has been shown and described. Many other uses are possible and desirable wherever positive relay action is desired.

I claim:

1. A positive pilot valve, including, in combination, a casing providing two valves, pressure-actuated means for moving said valves whereby one is opened as the other is closed, means for supplying fluid under pressure for operating said pressure means, a leak port being provided whereby when said leak port is open said pressure means is not effective to move said valves, a second pressure-actuated means adapted to be operatively connected to a thermostat, and snap means co-operating with said leak port and adapted to be operated by said second pressure-actuated means to completely open and completely close said leak port in a single short movement.

2. In combination, a casing and a pair of valves in said casing, one of said valves controlling a connection to a thermostat and the other valve controlling a connection to a heat control valve, said two valves being oppositely positioned, a diaphragm in said casing acting on said valves whereby movement of said diaphragm simultaneously closes one of said valves and opens the other, means providing a passage for fluid under pressure to the space behind said diaphragm, a leak port in said passage, a second diaphragm in said casing and a passage for fluid under pressure to the rear of said second diaphragm, said passage being open to fluid under pressure from a second thermostat, a snap spring overlying said leak port, and means connecting said second diaphragm to said snap spring whereby a relatively very slight movement of said second diaphragm will cause said snap spring to cover or uncover said leak port.

3. In combination, a casing and a pair of valves in said casing, one of said valves controlling a connection to a thermostat and the other valve controlling a connection to a heat control valve, said two valves being oppositely positioned, a diaphragm in said casing acting on said valves whereby movement of said diaphragms simultaneously closes one of said valves and opens the other, means providing a passage for fluid under pressure to the space behind said diaphragm, a restriction in said passage, a leak port also in said passage between said diaphragm and said restriction, a second diaphragm in said casing and a passage for fluid under pressure to the rear of said second diaphragm, said passage being open to fluid under pressure from a second thermostat, a snap spring overlying said leak port, and means connecting said second diaphragm to said snap spring whereby a relatively very slight movement of said second diaphragm will cause said snap spring to cover or uncover said leak port.

4. In combination, a casing and a pair of valves in said casing, one of said valves controlling a connection to a thermostat and the other valve controlling a connection to a heat control valve, said two valves being oppositely positioned, a diaphragm in said casing acting on said valves whereby movement of said diaphragm simultaneously closes one of said valves and opens the other, means providing a passage for fluid under pressure to the space behind said diaphragm, a leak port in said passage, a second diaphragm in said casing and a passage for fluid under pressure to the rear of said second diaphragm, said passage being open to fluid under pressure from a second thermostat, a snap spring overlying said leak port, and adjustable spring resisted means connecting said second diaphragm to said snap spring whereby a relatively very slight movement of said second diaphragm will cause said snap spring to cover or uncover said leak port.

5. In combination, a casing and a pair of valves in said casing, one of said valves controlling a connection to a thermostat and the other valve controlling a connection to a heat control valve, said two valves being oppositely positioned, a diaphragm in said casing acting on said valves whereby movement of said diaphragm simultaneously closes one of said valves and opens the other, means providing a passage for fluid under pressure to the space behind said diaphragm, a restriction in said passage, a leak port also in said passage between said diaphragm and said restriction, a second diaphragm in said casing and a passage for fluid under pressure to the rear of said second diaphragm, said passage being open to fluid under pressure from a second thermostat, a snap spring overlying said leak port, and means connecting said second diaphragm to said snap spring whereby a relatively very slight movement of said second diaphragm will cause said snap spring to cover or uncover said leak port, and an outlet from said first-mentioned passage, also between said diaphragm and said restriction, said outlet providing for an air supply of the same pressure as that which is effective on said first diaphragm.

HARRY BARNETT.